United States Patent [19]

Stavis

[11] 4,023,171
[45] May 10, 1977

[54] MICROWAVE VELOCITY SENSOR USING ALTIMETER ECHO
[75] Inventor: Gus Stavis, Wayne, N.J.
[73] Assignee: The Singer Company, Little Falls, N.J.
[22] Filed: Nov. 12, 1975
[21] Appl. No.: 631,024
[52] U.S. Cl. .................................. 343/8; 343/9
[51] Int. Cl.² ........................................ G01S 9/48
[58] Field of Search ................................ 343/8, 9

[56] References Cited

UNITED STATES PATENTS

| | | | |
|---|---|---|---|
| 3,013,262 | 12/1961 | Tollefson | 343/9 |
| 3,740,748 | 6/1973 | Hose | 343/8 |
| 3,742,501 | 6/1973 | Urkowitz | 343/8 X |
| 3,838,424 | 9/1974 | Goldfischer | 343/8 |

Primary Examiner—T.H. Tubbesing
Attorney, Agent, or Firm—Laurence A. Wright; Thomas W. Kennedy

[57] ABSTRACT

A velocity sensor system comprising a receiver capable of processing the narrow pulse speckle pattern return from a transmitting source in order to determine the velocity of the vehicle in which the velocity sensor is mounted. Three channels, each one connected to a receiving horn, receive the speckle pattern return signal equal in power but separated in space due to the spatial arrangement of the horns. A first local oscillator is connected to each channel and is controlled as part of an Automatic Frequency Control (AFC) loop. A carrier frequency from the first local oscillator along with the received signal is applied to the first mixer stage to produce a first IF signal which is applied to a wide band IF amplifier. The wideband IF amplifier is designed to blank the receiver during the transmitter pulse in order to prevent overloading of the receiver or overpowering of the echo. The output from the wide band IF amplifier in each channel is combined with the carrier frequency from a second oscillator and is applied to a second mixer. The output from the second mixer is applied to a narrow band IF amplifier which has the funnction of stretching returns in time so as to insure overlap of the total return energy. The signal from the narrow band IF amplifier is applied to the detector where the intelligence signal is removed from the carrier. From the detectors the signals are applied to frequency trackers which ultimately compute the ground speed and drift angle data of the vehicle by measuring the time it takes the speckle pattern to traverse the distance between receiving antennas.

10 Claims, 3 Drawing Figures

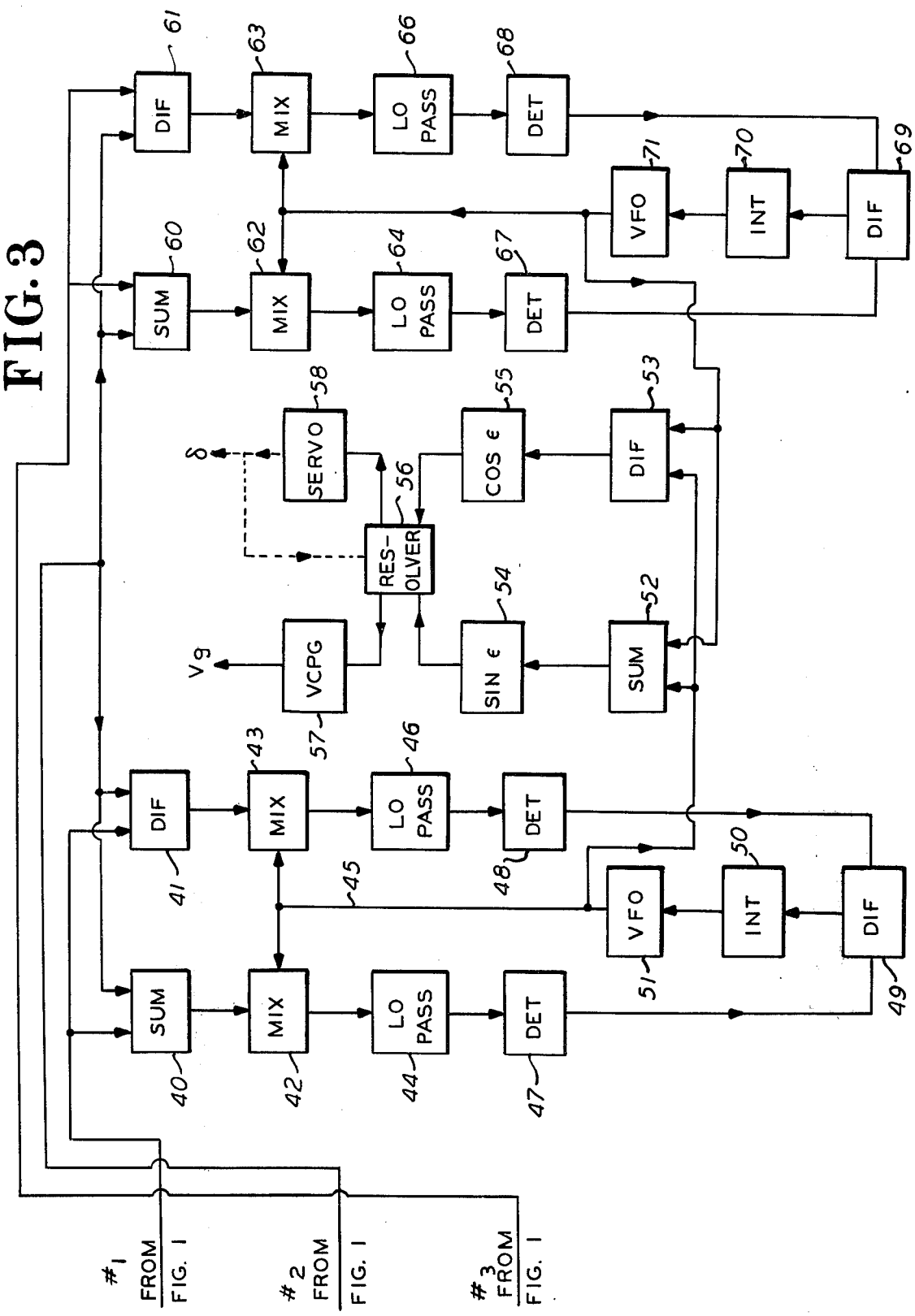

MICROWAVE VELOCITY SENSOR USING ALTIMETER ECHO

FIELD OF THE INVENTION

This invention is related to a velocity sensor system having a three channel microwave receiver that is capable of processing the speckle pattern signal return from a narrow pulse transmitter such as the type used in a radar altimeter in order to compute the velocity of the aircraft or vehicle in which the velocity sensor and the radar altimeter are mounted.

BACKGROUND OF THE INVENTION

In U.S. patent application Ser. No. 334,011 filed Feb. 20, 1973, now U.S. Pat. No. 3,838,424 assigned to the same assignee as the present application, there is described a radar system for sensing velocity of a vehicle. The radar system described therein operates upon the principle that when a radar beam illuminates the grund, part of the incident power is reflected with the distribution in space similar to the speckle patterns one observes visually when the illuminator is a laser. The radar produced speckle pattern will move as a whole if there is relative motion between the radiating source and the backscattering surface. The basic technique involves measuring the time required for the speckle pattern to traverse a predetermined distance and, from this measurement calculating the velocity of the source.

The receivers of the above radar system perform well in those situations where the source pulse duration is a large fraction of the pulse repetition period. However, where the source pulse duration is small relative to the repetition period and the beam width is large, the problem of temporal decorrelation of the spatial pattern of the backscattered signal occurs because the echo returns from the various parts of the illuminated area on the ground do not exist at the receiver simultaneously. Two effects produce this non-simultaneity, first the pulse energy travelling straight downward returns much earlier relative to the energy at the edge of the antenna beam, and second if the terrain is not flat within the antenna field of view there can be significant time separation of the returns. The significance of this non-simultaneity is that the microwave speckle pattern in space becomes decorrelated and therefore is more or less washed out. This effect will be present only at and above those altitudes where the return pulse is badly stretched due to the difference in round trip distance and hence the difference in time between the earliest and latest received components of the echo return.

Conventional pulse receivers use large bandwidths providing short time constants to preserve pulse fidelity. The solution presented herein to avoid the problem of decorrelation is to employ a special narrow band receiver in which by virtue of its long time constant, the various echo components are stretched in time sufficiently to effect overlap of the total return energy. Alternately, the effect of narrow banding can be visualized by saying that only a few of the transmitted pulse sidebands are received and therefore the system may be treated on a CW rather than a pulse basis. The solution to the problem as contemplated by the present invention is to provide a receiver band sufficiently wide to maximize signal-to-noise (S/N) ratio but not so wide as to allow decorrelation of the speckle pattern because of the aforementioned lack of simultaneity. It will also be necessary to provide automatic frequency control (AFC) so that the receiver remains tuned to the altimeter transmitter. In addition, the receiver must be blanked during the transmit time to preclude overload of the receiver and obscuring of the desired return signal.

BRIEF DESCRIPTION OF THE INVENTION

The present invention comprises a velocity sensor system comprising a receiver for processing speckle pattern returns from a narrow pulse transmitter source in order to obtain velocity information. The narrow pulse returns may emanate from a separate radar instrument such as an altimeter whose ground echo power provides a speckle pattern return. Although the ensuing discussion only deals with an altimeter pulse source, the pulse source is not limited to an altimeter. The source could be a DME beacon, radar, communications transmitter or other source. The receiver comprises three channels each having its own receiving horn. The three channels are identical to each other and comprise a first mixer connected to a wide band IF amplifier. The first mixer combines the transmitter return signals with a signal from a first local oscillator which is common to each channel in order to obtain a first IF signal. An AFC loop is connected to the first local oscillator to keep the receiver tuned to the transmitter frequency. The first IF signal is in turn applied to a second mixer which combines the signal with the output from a second local oscillator to provide a second IF signal. The second local oscillator has an input to the second mixers of all three channels. The second IF signal is then fed to a narrow band IF amplifier. Because of the narrowness of the narrow band IF amplifier, the returns from all scatterers are averaged and stretched in time so that there is overlap of the total return energy. The signal from the narrow band IF amplifier is then applied to a detector where the intelligence is removed from the carrier for subsequent processing in the frequency tracker to calculate velocity data.

Accordingly, it is an object of this invention to provide a velocity sensor having a receiver capable of processing energy from a narrow pulse source and deriving velocity information therefrom.

A further object of the invention is to provide a velocity sensor having a receiver comprising automatic frequency control so that the receiver remains tuned to the illuminating source.

A still further object of the invention is to provide a velocity sensor having a receiver comprising a blanking means for isolating the receiver during the transmit time of the source in order to preclude overload of the receiver and derrogation of the desired return signal.

These and further objects of the present invention will become more fully understood by reference to the description which follows and the accompanying drawing wherein:

FIG. 3 is a block diagram of the frequency tracker of the microwave velocity measuring system.

Figure 1:
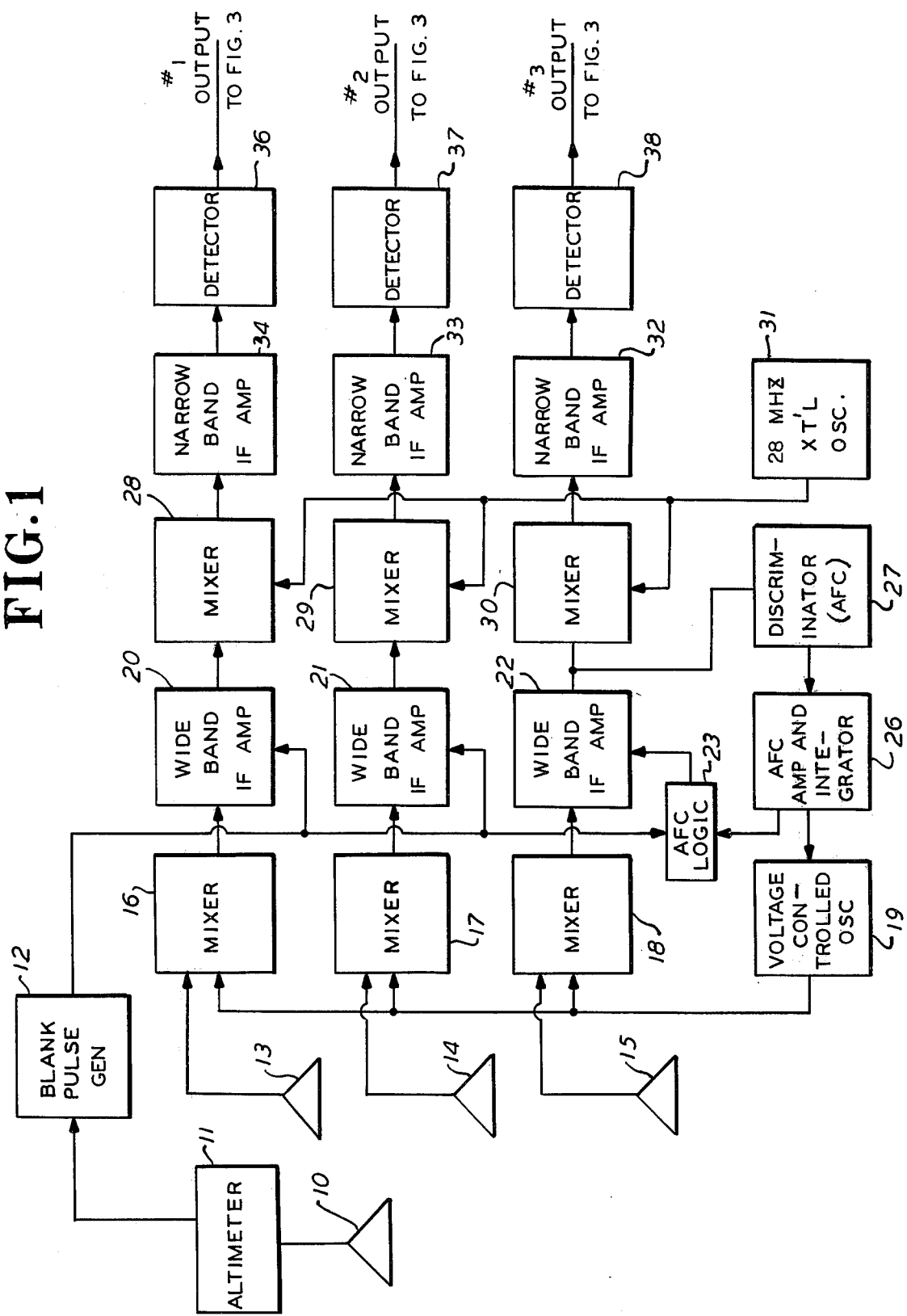
FIG. 1 is a block diagram of the three channel receiver of the invention.

FIGS. 1 and 3 when combined show the block diagrams of the velocity sensor system and the receiver of the invention. The system operates on the returned backscattered pattern received by the receiving horns which are spaced a known distance from each other and measures the time required for the speckle pattern to traverse the known distance and from this measurement calculates the velocity.

In FIG. 1 reference numeral 10 is the transmitting horn connected to altimeter 11. The transmitting horn is excited by a source of microwave power and radiates a beam toward the terrain below. For purposes of this description the transmitter may be postulated to have the following characteristics:

Power Output — 100 watts peak
Pulse Width — 100 nanoseconds
Pulse Repetition Rate — 10 KHZ
Carrier Frequency — 4.4 GHZ
Antenna Beam Width — ± 30 degrees to 3db The receiver of the present invention is of the superheterodyne type and contemplates measurement of velocity from a narrow pulse generating source. However, the principle of operation would be the same with a CW (continuous wave) source. A portion of the transmitted power is scattered back in the direction of the receiving horns 13, 14 and 15. The random nature of the scattering surface causes a density map of the backscattered power to have a speckled appearance. As the vehicle containing the velocity sensor system moves in one direction V, the speckles move in the opposite direction at the same speed with respect to the ground. Relative to each of the receiving horns therefore, the speckles move with a velocity 2V. Identical power sensors in each of the three receiver channels would yield the same waveforms, each signal being produced by the same traverse of speckle pattern of the backscattered power. However, since the receiving horns are separated from each other by a known distance $d$ the receiver power sensors will develop waveforms which are displaced in time by determinable amounts. A blanking or ATR pulse provided by blanking pulse generator 12 is used to turn off the receiver during transmitter on time.

The receiver channel connected to receiving horn 13 is designated as channel 1, the channel connected to receiving horn 14 is designated as channel 2, and the channel connected to receiving horn 15 is designated as channel 3. Channel 1 comprises a first mixer 16 which mixes the return signals from horn 13 with a signal from local oscillator 19 to produce a first IF signal. Specifically, the first mixer mixes the first local oscillator frequency with the return echo to derive an IF frequency of 30 MHZ. The IF signal from the first mixer is applied to wide band IF amplifier 20 which has a band width of 10 MHZ. The output from the wide band IF amplifier is applied to a second mixer 28 which also receives an input from a second local oscillator 31 having an output frequency of 28 MHZ. The output of mixer 28 is a second IF signal of 2 MHZ which is applied to narrow band IF amplifier 34 that has a band width of 80 KHZ. The purpose of narrow band IF amplifier 34 is to make use of its long time constant to average the return from all scatterers by stretching all returns in time so as to insure overlap of the total return energy. This is accomplished by passing a very small number of side band frequencies which cluster about the center second IF frequency of 2 MHZ. All other side bands of the second IF are rejected or suppressed. The signal from narrow band IF amplifier 34 is then applied to detector 36 where the intelligence signal is removed from the carrier for later processing in the frequency trackers.

The signal flow in channel 2 is from mixer 17, wide band IF amplifier 21, mixer 29, narrow band IF amplifier 33 to detector 37. The signal flow in channel 3 is from mixer 18, wide band amplifier 22, mixer 30, narrow band IF amplifier 32 to detector 38. The circuit blocks of channels 2 and 3 perform in the same manner as discussed with regard to channel 1.

The first local oscillator 19 is voltage controlled as part of the AFC loop and is connected to the first mixers of the three receiver channels. The AFC loop comprises blank pulse generator 12, wide band IF amplifier 22, discriminator 27, integrator 26 and AFC logic 23. If amplifier 22 permits the blanking of the narrow transmitter pulse during transmitter on time in order to prevent overloading of the receivers or overloading of the echo. At initial turn-on of the system the AFC logic 23 prevents the blanking pulse generator 12 from operating on IF amplifier 22 in channel 3. This logic may simply be an AND gate which is enabled by the output comparator which compares the control voltage output of integrator 26 with a preset value indicating a nominal correct frequency. Thus, the transmitter pulse will be sensed in this channel and will be a high amplitude because of the proximity of the altimeter antenna. This strong signal will permit ready capture of the transmitter frequency in the AFC loop. Once locked to the proper frequency the AFC logic will permit the transmitter blanking pulse to operate on IF amplifier 22. AFC action from this time forward will be performed on the echo signal. If the signal disappears or if lock is lost, the cycle will be repeated. The second IF is chosen to be as narrow as feasible without losing the ability to sense speckles. This is a function of altitude and antenna beam width. The essential criterion in this choice is that the maximum difference in propagation distance within the transmitted beam, (i.e., between the nadir ray and 3db ray assuming a flat ground) should be less than a quarter wavelength for a wave equal in frequency to the IF band width. As an example, let us select an altitude of 20,000 feet and a beam width of 60° between 3db points. The differential distance is:

$$= \frac{20,000}{\text{Cos } 30°} - 20,000 = 3100 \text{ ft.} = 945\text{m}.$$

$$I.F. \ BW = \frac{300 \times 10^6 \text{ m/sec}}{4 \times 945 \text{ m}} = \frac{320 \text{ KHZ}}{4} = 80 \text{ KHZ}$$

The outputs of the detectors 36, 37 and 38 are applied to the frequency tracker circuits of FIG. 3 for computation of the two components of velocity (i.e. ground speed and drift angle).

Figure 2:
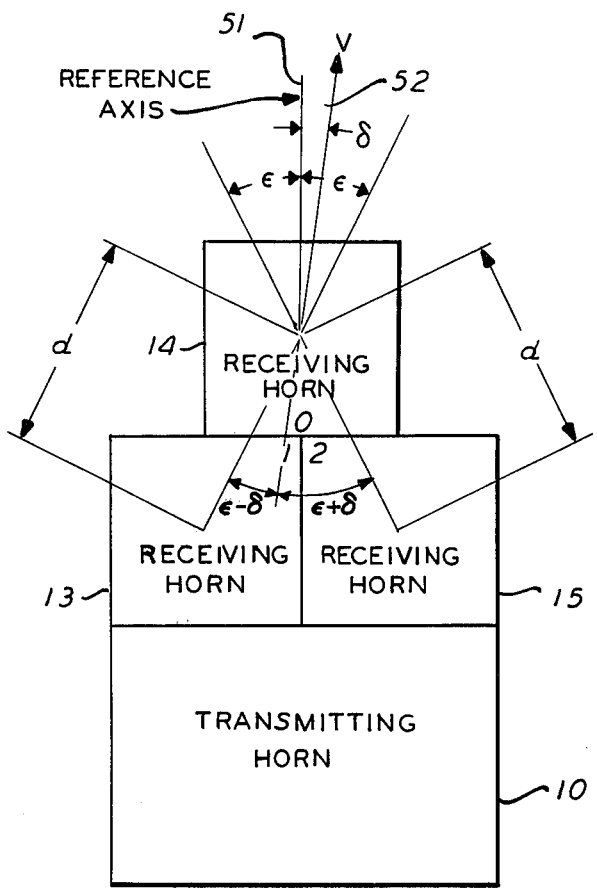
FIG. 2 is a block diagram of the arrangement of the receiving horns.

Turning to FIG. 2, three horns are necessary where two components of velocity are to be measured. This is accomplished by using the three horns in pairs provided the lines connecting their centers are not colinear. The horns 13 and 14 form one pair and the horns 14 and 15 form the other pair. The horns 14, 13 and 15 are also designated as 0, 1 and 2 respectively and will be referred to hereafter by these designations. The system axis 51 is the line bisecting the angle formed by the lines joining the centers of 01 pair and the 02 pair of horns. The distance between centers of each pair is assumed to be the same and equal to $d$. The magnitude of the angle between each line center and the reference axis is designated as $\epsilon$. If the velocity vector 52 makes an angle of δ with respect to the reference direction, then the time delay between corresponding waveforms for each pair is $$\tau_{o-1} = \frac{d \cos (\epsilon - \delta)}{2V}, \tau_{o-2} = \frac{d \cos (\epsilon + \delta)}{2V}$$

It should be noted that it is the projection of the distance between the two horns of each pair onto the velocity vector which accounts for the time delay.

In the development of the preceeding paragraph, it is implicitly assumed that although the two horns of a given pair do not cross the speckle pattern on precisely the same tracks, the speckles are nonetheless sufficiently large that resultant waveforms are still essentially the same.

Referring to FIG. 3, the blocks to the left and right show the two frequency trackers while the center blocks show the resolver servo and the outputs $V_g$ and δ. The pair of receiver channels 13 and 14 have their detectors 36 and 37, connected to summing network 40 and difference network 41. The pair of receiver channels 14 and 15 have their individual detectors connected to the right hand frequency tracker comprising summing network 60 and difference network 61. The discussion which follows will deal with the left hand frequency tracker. Since the right hand frequency tracker operates identically as the left hand frequency tracker it will not be discussed in detail except as noted below.

From summing network 40 the signal is applied to mixer 42 thence to low pass filter 44, square law detector 47 and then to difference circuit 49. The signal from difference circuit 41 is applied to mixer 43, low pass filter 46, square law detector 48 and thence to difference circuit 49. The difference in block 49 between the DC levels developed at the two square law detectors 47 and 48 is used to drive an integer 50 whose output controls variable frequency oscillator 51. Feedback polarities on line 45 are such as to cause the tracking oscillator to seek and come to rest at the first crossover frequency ($f_c$) between receiver channels 1 and 2. The first point where the sum and difference channels have the same power density is ($f_i$). While the signals from receiver channels 1 and 2 are being processed in the frequency tracker, the outputs from receiver channels 2 and 3 are being processed in the same manner as described with regard to channels 1 and 2.

The signals from variable frequency oscillators 51 and 71 are applied to summing network 52 and difference network 53. The output from summing network 52 has a sine ϵ function performed on it in block 54. The signal from difference network 53 has a cosine ϵ function performed on it in block 55. These signals are applied to the primary of resolver 56. At the secondary of the resolver we obtain ground speed ($V_g$) by way of voltage control period generator 57. $V_g$ is the projection of the total velocity into the plane defined by the centers of the three receiving horn apertures. However, for the intended application of fixed mounting to aircraft which fly mostly straight and level $V_g$ is essentially ground speed. Drift angle (δ) is obtained by way of servo block 58. For a more detailed discussion of the calculation of signals applied to the frequency tracker, reference is made to U.S. Pat. No. 3,838,424 cited above.

From the foregoing, a three channel receiver for measuring ground speed and drift angle derived from a narrow source pulse has been described. Although a specific three channel receiver operable on a received narrow pulse has been shown and described, it will be obvious to those skilled in the art that various modifications may be made without departing from the spirit of the invention which is intended to be limited solely by the appended claims.

What is claimed is:
1. A velocity sensor system comprising:
a source of narrow pulse radio signals,
a plurality of receiving antennas spaced from each other for the reception of said signals backscattered from the ground,
means for combining received radio signals with a first internally generated signal and producing thereby a first intermediate frequency,
means for combining said first intermediate frequency with a second internally generated signal and thereby providing a second intermediate frequency,
means for deriving intelligence signals from said second intermediate frequency, and
means for measuring the time required for the received signals to traverse the distance between said receiving antennas whereby the velocity and drift angle of said vehicle may be determined.
2. The apparatus of claim 1 comprising:
means for maintaining said first internally generated signal at a fixed frequency.
3. The apparatus of claim 2 comprising:
means for blanking said receiver during periods when said receiver is not tuned for reception.
4. The apparatus of claim 3 comprising:
means for enabling said receiver prior to reception for controlling the frequency of said first internally generated frequency.
5. The apparatus of claim 4 comprising:
a plurality of receiving channels in said receiver each comprising a mixer for combining said received signals with said first internally generated signals,
a first IF amplifier, and
a detector for removing the intelligences from the IF signal.
6. The apparatus of claim 5 comprising:
three receiving antennas one for each receiving channel said receiving antennas being spaced a predetermined distance from each other so that received signals are alike but separated in time.
7. The apparatus of claim 6 comprising:
means for stretching the returns for all scatterers so that there is time overlap of the total return energy and for supressing the side band frequencies of the return signal.
8. A three channel microwave receiver each of said channels comprising:
a receiving antenna said antennas of each receiver oriented so that the distance between the centers of separate pairs are equal,
a first mixer,
a wide band IF amplifier,
a second mixer,
a narrow band IF amplifier,
a detector,
a first local oscillator connected to the inputs of each of said first mixers for providing a wide band IF frequency at the output of said IF amplifier, and a second local oscillator connected to the inputs of each of said second mixers for providing a narrow band IF frequency at the output of said second IF amplifier whereby said detectors provide a signal at their outputs capable of being used to determine the velocity of a received speckle pattern as it traverses the distance between said receiver horns.

9. The apparatus of claim 8 comprising:

means for automatically controlling the frequency of said first local oscillator.

10. The apparatus of claim 9 comprising:

means for unblanking one of said receiver channels to receive a transmitter signal during a transmitting period and thereafter blanking said receiver during subsequent transmission times.

* * * * *